US012151208B2

(12) United States Patent
Kambe et al.

(10) Patent No.: US 12,151,208 B2
(45) Date of Patent: Nov. 26, 2024

(54) STABLE ISOTOPE CONCENTRATION METHOD

(71) Applicant: TAIYO NIPPON SANSO CORPORATION, Tokyo (JP)

(72) Inventors: Takashi Kambe, Tokyo (JP); Takehiro Igarashi, Tokyo (JP); Hitoshi Kihara, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 163 days.

(21) Appl. No.: 17/914,971

(22) PCT Filed: Mar. 8, 2021

(86) PCT No.: PCT/JP2021/008972
§ 371 (c)(1),
(2) Date: Sep. 27, 2022

(87) PCT Pub. No.: WO2021/199934
PCT Pub. Date: Oct. 7, 2021

(65) Prior Publication Data
US 2023/0104429 A1    Apr. 6, 2023

(30) Foreign Application Priority Data

Mar. 31, 2020 (JP) ................. 2020-062432

(51) Int. Cl.
*B01D 59/04*    (2006.01)
*F25J 3/08*    (2006.01)

(52) U.S. Cl.
CPC ............... *B01D 59/04* (2013.01); *F25J 3/08* (2013.01); *F25J 2215/50* (2013.01); *F25J 2220/90* (2013.01)

(58) Field of Classification Search
CPC . B01D 59/04; F25J 3/08; F25J 2215/50; F25J 2220/90
See application file for complete search history.

(56) References Cited

U.S. PATENT DOCUMENTS 6,321,565 B1    11/2001 Kihara et al.
6,461,583 B1    10/2002 Hayashida et al.
(Continued)

FOREIGN PATENT DOCUMENTS

EP    1 997 551 A1    12/2008
JP    6-134260    5/1994
(Continued)

OTHER PUBLICATIONS

Extended European Search Report mailed Mar. 27, 2024 in European Application No. 21782316.0, 7 pages.
(Continued)

*Primary Examiner* — Renee Robinson
(74) *Attorney, Agent, or Firm* — Nixon & Vanderhye P.C.

(57) ABSTRACT

The object of the present invention is to provide a stable isotope concentration method that reduces equipment cost and power without prolonging the start-up time and enables efficient concentration, and the present invention provides a stable isotope concentration method using multiple cascaded distillation columns (1st column to mth column; m is an integer of 2 or more), wherein the method includes a step in which one of gas and liquid is supplied from a position in the vicinity of the bottom of a (n−1)th column to a position in the vicinity of the top of an nth column (1<n≤m), and the other of liquid and gas is returned from a position in the vicinity of the top of the nth column to a position in the vicinity of the bottom of the (n−1)th column; and wherein in each distillation column, when a flow rate of an ascending gas in the column is a first flow rate and a flow rate of the gas or the liquid supplied from a previous column or a next (Continued)

column is a second flow rate, the second flow rate is 4% by volume or more with respect to the first flow rate.

2 Claims, 4 Drawing Sheets

(56) References Cited

U.S. PATENT DOCUMENTS

| | | |
|---|---|---|
| 6,560,990 B2 | 5/2003 | Hayashida et al. |
| 6,565,629 B1 | 5/2003 | Hayashida et al. |
| 6,835,287 B1 | 12/2004 | Kihara et al. |
| 7,297,237 B2 | 11/2007 | Asano et al. |
| 7,393,447 B2 | 7/2008 | Kihara et al. |
| 7,922,872 B2 | 4/2011 | Kihara et al. |
| 9,194,623 B2 | 11/2015 | Kihara |
| 2015/0068247 A1 | 3/2015 | Kihara |

FOREIGN PATENT DOCUMENTS

| | | |
|---|---|---|
| JP | 7-148419 | 6/1995 |
| JP | 5132822 | 1/2013 |
| JP | 2013-204850 | 10/2013 |
| JP | 2016-172239 A | 9/2016 |

OTHER PUBLICATIONS

International Search Report for PCT/JP2021/008972, mailed Apr. 13, 2021, 4 pages.

STABLE ISOTOPE CONCENTRATION METHOD

This application is the U.S. national phase of International Application No. PCT/JP2021/00897 filed Mar. 8, 2021, which designated the U.S. and claims priority to JP Patent Application No. 2020-062432 filed Mar. 31, 2020, the entire contents of each of which are hereby incorporated by reference.

TECHNICAL FIELD

The present invention relates to a stable isotope concentration method.

BACKGROUND ART

As a method for separating a stable isotope that exists in a very small amount in the natural world, separation methods such as thermal diffusion separation, centrifugal force separation, laser separation, chemical exchange separation, and distillation separation are known. Among these separation methods, distillation separation is suitable for mass production of light elements. Therefore, for example, a water distillation separation or an oxygen distillation separation is adopted as an industrial oxygen stable isotope separation method.

Stable isotope separation by distillation has a characteristic in that the separation coefficient is extremely close to 1, so several thousand theoretical plates are required to obtain a stable isotope having a high concentration. However, since the height of the distillation column is limited, it is necessary to divide the distillation column into a plurality of distillation columns and connect this plurality of divided distillation columns in series (hereinafter, also referred to as "cascade connection"). In addition, stable isotope has a small natural abundance ratio, so the amount of product is very small compared to the feed amount of a raw material.

Therefore, among the plurality of distillation columns connected in series, the diameter of the column that feeds the raw material is the largest. The concentration of the product in the column increases as it approaches the end of the recovery section/concentration section, so that the column diameter can be reduced (also called "stepped cascade"). This not only reduces the equipment cost, but also contributes to shortening the start-up time because the amount of liquid hold-up is reduced. On the other hand, in order to reduce the column diameter, it is necessary to provide both a condenser and a reboiler in the column with a reduced diameter, and an increase in power occurs due to an increase in the number of condensers and reboilers.

Conventionally, in order to connect a plurality of distillation columns, it is common that liquid is supplied from the bottom of an nth distillation column into the top of a next column ((n+1)th column), and gas is supplied from the top of the nth distillation column into a previous column ((n−1)th distillation column). On the other hand, in Patent Document 1, when connecting a plurality of distillation columns, gas is supplied from the bottom of the nth distillation column into the top of the next column ((n+1)th distillation column), and liquid is supplied from the top of the nth distillation column into the bottom of the previous column ((n−1)th distillation column).

PRIOR ART DOCUMENTS

Patent Documents

Patent Document 1 Japanese Patent No. 5132822

SUMMARY OF INVENTION

Problem to be Solved by the Invention

As mentioned above, in isotope separation, a very long distillation column is divided into a plurality of columns, and these columns are connected in series for separation. By providing a condenser and a reboiler in each column, the concentration can be increased. In addition, by reducing the column diameter, excessive power is not required and the start-up time can be shortened. In order to reduce the required power, it is necessary to reduce the operating power of the reboiler that generates an ascending gas in each column and the condenser that generates a descending liquid, and secure a flow rate of the raw material required to connect each column. If the flow rate of the raw material required to connect each column is excessive, the energy consumption of the condenser and the reboiler will increase, and the piping will become large, so the equipment cost will also increase. On the other hand, if the flow rate of the raw material required to connect each column is insufficient, there will be a difference in concentration between the distillation columns, and it will not be possible to concentrate efficiently.

The present invention has been made in view of the above circumstances, and an object of the present invention is to provide a stable isotope concentration method that reduces equipment cost and power without prolonging the start-up time and enables efficient concentration.

Means for Solving the Problem

In order to achieve the object, the present invention uses the following configurations.

[1] A stable isotope concentration method using multiple cascaded distillation columns (1st column to mth column; m is an integer of 2 or more),
wherein the method includes a step in which one of gas and liquid is supplied from a position in the vicinity of the bottom of a (n−1)th column to a position in the vicinity of the top of an nth column (1<n≤m), and the other of liquid and gas is returned from a position in the vicinity of the top of the nth column to a position in the vicinity of the bottom of the (n−1)th column; and
wherein in each distillation column, when a flow rate of an ascending gas in the column is a first flow rate and a flow rate of the gas or the liquid supplied from a previous column or a next column is a second flow rate, the second flow rate is 4% by volume or more with respect to the first flow rate.

[2] The stable isotope concentration method according to [1], wherein the stable isotope is $^{18}O$, and the second flow rate is 4% by volume or more with respect to the first flow rate.

Effects of the Invention

According to the stable isotope concentration method of the present invention, equipment cost and power can be reduced without prolonging the start-up time, and efficient concentration becomes possible.

DETAILED DESCRIPTION OF THE PREFERRED EMBODIMENTS

Hereinafter, the present invention will be described in detail with reference to the drawings, showing embodiments.

In the drawings used in the following description, in order to make the features easier to understand, the featured parts may be enlarged for convenience, and the dimensional ratios of each component may not be the same as the actual ones.
<Stable Isotope Concentration Device>

Figure 1:
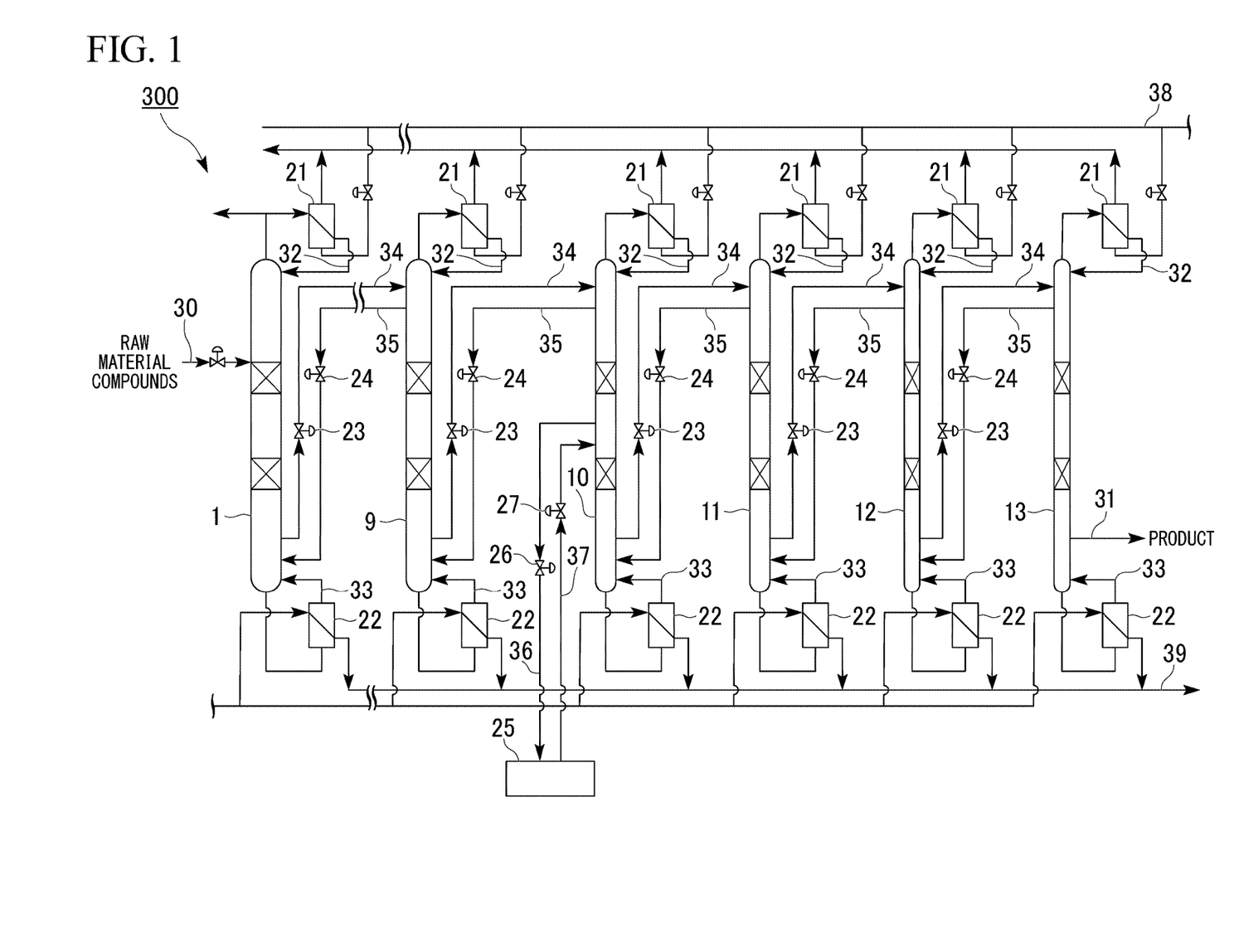
FIG. 1 is a system diagram showing a configuration of a stable isotope concentration device applicable to the stable isotope concentration method according to the embodiment of the present invention.

FIG. 1 is a system diagram showing a configuration of a stable isotope concentration device applicable to the stable isotope concentration method according to the embodiment of the present invention.

A stable isotope concentration device 300 of the present embodiment includes a distillation column group in which 13 distillation columns 1 to 13 are cascaded, an isotope scrambler 25, 13 condensers 21, 13 reboilers 22, a raw material supply line 30, a product recovery line 31, an isotope concentrated gas introduction line 36 and an isotope concentrated gas return line 37. The stable isotope concentration device 300 of the present embodiment is a device that concentrates a stable isotope compound component (hereinafter, may be simply referred to as "stable isotope") containing an arbitrary stable isotope element contained in the raw material compound to a high concentration.

The stable isotope concentration device 300 further includes supply lines 34 that supply the raw material from the previous column to the next column, and return lines 35 that return the raw material from the next column to the previous column between each distillation column. Each supply line 34 is provided with an on-off valve 23. Each return line 35 is provided with an on-off valve 24.

Hereinafter, the nth distillation column from the upstream end of the distillation column group is referred to as the nth distillation column.

In FIG. 1, due to space limitation, among the first to thirteenth distillation columns 1 to 13, only the first distillation column 1 to which a high-purity raw material compound (hereinafter, may be simply referred to as "raw material") is supplied, and the 9th to 13th distillation columns 9 to 13 are shown.

The 1st to 13th distillation columns 1 to 13 are cascade-connected in the order of the first distillation column 1 to which the raw material is supplied, the second distillation column 2, the third distillation column 3, the fourth distillation column 4, the fifth distillation column 5, the sixth distillation column 6, the seventh distillation column 7, the eighth distillation column 8, the ninth distillation column 9, the tenth distillation column 10, the eleventh distillation column 11, the twelfth distillation column 12, and the thirteenth distillation column 13 (distillation column at the downstream end of the distillation column group).

In the first to thirteenth distillation columns 1 to 13, by distilling a stable isotope compound containing a stable isotope element (performing a distillation cascade process), a light stable isotope compound having a low boiling point is concentrated on the top side of the columns, and a heavy stable isotope compound with a high boiling point is concentrated on the bottom side of the columns.

Among the first to thirteenth distillation columns 1 to 13, the first distillation column 1 to which the raw material is supplied has the largest distillation load, and therefore has the largest column diameter. In addition, since the abundance ratio of the heavy stable isotope is usually small, from the upstream end to the downstream end, the distillation load gradually decreases from the first distillation column 1 (column diameter decreases).

Sieve trays, structured packings, random packings, and the like (none of which are shown) are provided in each of the first to thirteenth distillation columns 1 to 13.

One end of the supply line 34 is connected to a position in the vicinity of the bottom of the column of the (n−1)th distillation column ($1 < n \leq m$; m is an integer of 2 or more). Further, the other end of the supply line 34 is connected to a position in the vicinity of the top of the nth distillation column. The gas in the (n−1)th distillation column is led out into the supply line 34. The raw material gas led out into the supply line 34 is introduced into the nth distillation column after the flow rate is controlled by the on-off valve 23.

One end of the return line 35 is connected to a position in the vicinity of the top of the nth distillation column. Further, the other end of the return line 35 is connected to a position in the vicinity of the bottom of the (n−1)th distillation column ($1 < n \leq m$; m is an integer of 2 or more). The liquid in the nth distillation column is led out into the return line 35. The raw material liquid led out into the return line 35 is introduced into the (n−1)th distillation column after the flow rate is controlled by the on-off valve 24.

One condenser 21 is provided in each distillation column (first to thirteenth distillation columns 1 to 13).

The condenser 21 is provided on a circulation line 32 in which both ends thereof are connected at different positions at the top of each distillation column. The condenser 21 has a function of liquefying the ascending gas in the distillation column by heat exchange and descending the liquid in the distillation column again. The condenser 21 can reduce the pressure at the top of each column, and can prevent a decrease in the separation coefficient due to the pressure increase when the columns are connected in series. In the present embodiment, a heat transfer medium fluid circulation line 38 that circulates the heat transfer medium fluid through the plurality of condensers 21 is provided, and heat exchange is performed by the heat transfer medium fluid that circulates through the heat transfer medium fluid circulation line 38.

One reboiler 22 is provided for each distillation column.

The reboiler 22 is provided on a circulation line 33 in which both ends are connected at different positions at the bottom of each distillation column. The reboiler 22 has a function of vaporizing the descending liquid in the distillation column by heat exchange and ascending the gas in the distillation column again. In the present embodiment, a heat transfer medium fluid circulation line 39 that circulates the heat transfer fluid through the plurality of reboilers 22 is provided, and heat exchange is performed by the heat transfer fluid that circulates through the heat transfer fluid circulation line 39.

One end of the raw material supply line 30 is connected to an intermediate portion of the first distillation column 1. The raw material supply line 30 is a line that supplies a high-purity raw material into the intermediate portion of the first distillation column 1. The raw material supply line 30 is provided with a valve.

The intermediate portion of the distillation column indicates a position other than the top and bottom of the distillation column.

High purity means that the total impurity concentration of the raw material is 0.001% or less.

The stable isotope compound that can be concentrated by the stable isotope concentration method of the present embodiment is not particularly limited. Examples of the stable isotope compound that can be concentrated include oxygen, water, carbon monoxide, nitric oxide and the like.

One end of the isotope concentrated gas introduction line 36 is connected to the intermediate portion of the tenth distillation column 10, and the other end is connected to the isotope scrambler 25. A valve 26 is provided in the isotope concentrated gas introduction line 36.

When the valve 26 is open, the isotope concentrated gas introduction line 36 leads out a part or all of the raw material compound from the tenth distillation column 10 and supplies it into the isotope scrambler 25.

The raw material compound led out from the tenth distillation column 10 includes a stable isotope compound concentrated by the first to tenth distillation columns 1 to 10.

The isotope scrambler 25 converts a stable isotope compound containing a stable isotope element into a stable isotope compound containing another stable isotope element by an isotope exchange reaction (isotope scrambling). This makes it possible to obtain a concentrate in which the concentration of the stable isotope compound containing the desired stable isotope element is further increased. The concentrate obtained by the isotope scrambler 25 is returned into the tenth distillation column 10 by the isotope concentrated gas return line 37.

One end of the isotope concentrated gas return line 37 is connected to the isotope scrambler 25, and the other end is connected to the tenth distillation column 10. A valve 27 is provided in the isotope concentrated gas return line 37.

When the valve 27 is open, the isotope concentrated gas return line 37 returns the concentrate obtained by further increasing the concentration of the stable isotope compound containing the desired stable isotope element from the isotope scrambler 25 into the tenth distillation column 10.

The raw material compound returned into the tenth distillation column 10 is distilled in the eleventh to thirteenth distillation columns 11 to 13, and the stable isotope compound containing a desired stable isotope element is further concentrated.

The product recovery line (lead line) 31 is a route for recovering a stable isotope compound containing a concentrated desired stable isotope element as a product. One end of the product recovery line 31 is connected to a lower portion (position in the vicinity of the bottom) of the thirteenth distillation column 13.

<Stable Isotope Concentration Method>

Next, the stable isotope concentration method according to the embodiment of the present invention will be described with reference to FIG. 1. In the present embodiment, the stable isotope concentration device 300 shown in FIG. 1 is used to concentrate the stable isotope.

The stable isotope concentration method of the present embodiment is a method for separating a stable isotope using the plurality of cascaded distillation columns (first column to mth column; m is an integer of 2 or more), wherein gas is supplied from a position in the vicinity of the bottom of the (n−1)th column into a position in the vicinity of the top of the nth column (1<n≤m), and liquid is returned from a position in the vicinity of the top of the nth column into a position in the vicinity of the bottom of (n−1)th column.

Then, in each distillation column (in the stable isotope concentration device 300 shown in FIG. 1, the second distillation column 2 to the thirteenth distillation column 13), the flow rate of the ascending gas in the column is set as a first flow rate, the flow rate of the gas supplied from the previous column is set as a second flow rate, and the second flow rate is 4% by volume or more with respect to the first flow rate.

Here, according to the stable isotope concentration method of the present embodiment, by setting the second flow rate to 4% by volume or more with respect to the first flow rate, there is substancialty no difference in the concentration between each connection point of column, so that efficient concentration can be achieved. Further, the second flow rate with respect to the first flow rate is more preferably 5% by volume or more.

Further, as described in Examples later, even when the stable isotope is $^{18}O$, it is preferable that the second flow rate be 4% by volume or more with respect to the first flow rate. By operating the stable isotope concentration device 300 in this way, the abundance of the stable isotope molecules of oxygen gas led out from the bottom of the thirteenth distillation column 13 at the time of stable operation of the device can be adjusted such that the concentration of $^{18}O$ is 97 atomic % or more.

Further, the upper limit of the second flow rate with respect to the first flow rate is preferably 30% by volume or less from the viewpoint of energy consumption reduction.

Moreover, in the cascade process, a return line 35 to the previous column is also required. The flow rate in the return line 35 needs to be substantially the same as the flow rate in the supply line 34.

According to the stable isotope concentration method of the present embodiment, a effective increase in the concentration in the distillation columns can be maintained by adjusting the flow rate of the gas or the liquid connecting the distillation columns to 4 to 30% by volume with respect to the flow rate of the ascending gas (first flow rate) in each column Thereby, a small variation in the concentration in the distillation columns can be maintained. As a result, the energy consumed by the reboiler and the condenser installed in each column can be reduced, and high-purity products can be obtained.

As described above, according to the stable isotope concentration method of the present embodiment, it is possible to reduce equipment costs and power consumption without prolonging the start-up time of the stable isotope concentration device 300, and to achieve efficient concentration.

The technical scope of the present invention is not limited to the embodiments above, and various modifications can be made without departing from the scope of the present invention.

For example, the number of the distillation columns (cascaded distillation columns) constituting the distillation column group of the stable isotope concentration device 300 is not limited to 13, but can be any number. The distillation column is not limited to a packed column packed with structured packing, but may be a packed column packed with random packing or a tray column.

The connection of the isotope scrambler is not limited to the tenth distillation column 10, and may be a distillation column other than the tenth distillation column 10. However, at least one of the distillation columns to which the isotope scrambler 25 is connected is a distillation column other than the distillation column arranged at the downstream end of the distillation column group. In the stable isotope concentration device 300 of the embodiment above, the configuration including the isotope scrambler 25 has been described as an example, but the configuration may be such that the isotope scrambler 25 is unnecessary depending on the fluid used.

In addition, in the stable isotope concentration device 300 of the embodiment above, the configuration in which the raw material is supplied into the first column has been described as an example, but the present invention is not limited to this embodiment. Depending on the composition of the raw material and the required yield, the raw material may be supplied to columns other than the first column.

In the embodiment above, in the stable isotope concentration device 300 to which the stable isotope concentration method is used, the condenser 21 and the reboiler 22 are provided in each distillation column, but the invention is not limited to this embodiment. For example, the condenser 21 and the reboiler 22 may be provided every several columns.

Further, in the stable isotope concentration device 300 to which the stable isotope concentration method in the embodiment above is used, the gas is supplied from the position in the vicinity of the bottom of the (n−1)th column into the position in the vicinity of the top of the nth column ($1<n\leq m$), and the liquid is returned from the position in the vicinity of the top of the nth column into the position in the vicinity of the bottom of the (n−1)th column. But the present invention is not limited to this embodiment. In the stable isotope concentration device, the liquid may be supplied from the position in the vicinity of the bottom of the (n−1)th column into a position in the vicinity of the top of the nth column ($1<n\leq m$), and the gas may be supplied from the position in the vicinity of the top of the nth column into the position in the vicinity of the bottom of the (n−1)th column. By adopting such a configuration, the capacities of the condenser 21 and the reboiler 22 provided in each distillation column can be made smaller. However, since a liquid pump is required to supply the liquid into the next column, it is necessary to adjust the energy consumption.

EXAMPLES

The present invention will be described in detail below through verification tests, but the present invention is not limited thereto.

<Verification Test 1>

Test Example 1

$^{18}O$ was concentrated using the stable isotope concentration device 300 shown in FIG. 1. The distillation column group included 13 distillation columns, and the distillation columns were packed columns. Liquid nitrogen was used as a cold source for the condenser 21, and the liquid nitrogen was supplied into each condenser 21 from the heat medium fluid circulation line 38. Nitrogen gas was used as a heat source for the reboilers 22, and the nitrogen gas was supplied into each reboiler 22 from the heat medium fluid circulation line 39.

In addition, the stable isotope concentration device 300 was provided with the isotope scrambler 25. One end of the isotope enriched gas introduction line 36 was connected to the tenth distillation column 10, and the other end was connected to the isotope scrambler 25. Accordingly, some or all of the oxygen was led out and supplied into the isotope scrambler 25. The oxygen subjected to the isotope exchange reaction in the isotope scrambler 25 was returned into the tenth distillation column 10 through the isotope enriched gas return line 37.

The high purity oxygen raw material had the natural abundance ratio. The top pressure of each distillation column was 20 kPaG. When the device was operated stably, the abundance of the stable isotope molecules in the oxygen gas led out from the bottom of the thirteenth distillation column 13 was set so that $^{18}O$ was 97 atomic % or more. The flow rate of the gas and the liquid connecting the distillation columns was set to 5% with respect to the flow rate of the ascending gas in each column.

Figure 2:
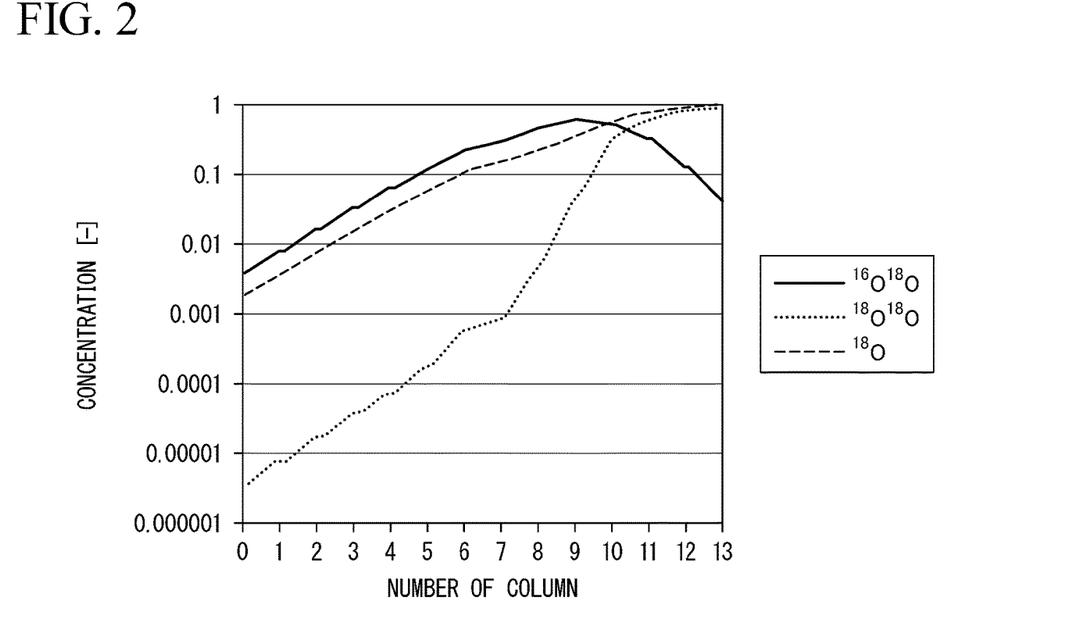
FIG. 2 is a graph for verifying the effect of the present invention.

FIG. 2 shows the concentration distribution of each distillation column in Test Example 1.

As shown in FIG. 2, according to Test Example 1, the concentration of the target $^{18}O$ in the final column (13th distillation column 13) was 97.5 atomic %.

Test Example 2

In Test Example 2, the device and the operation conditions were the same as in the Test Example 1, except that the flow rate of the gas and the liquid connecting the distillation columns was set to 4% with respect to the flow rate of the ascending gas in each column.

Figure 3:
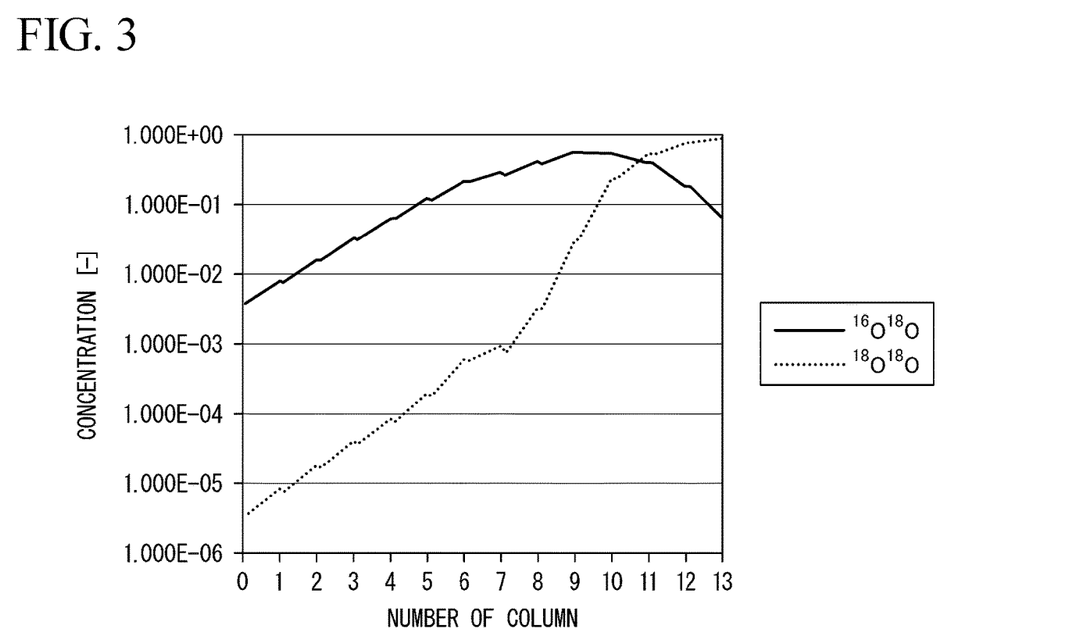
FIG. 3 is a graph for verifying the effect of the present invention.

FIG. 3 shows the concentration distribution of each distillation column in Test Example 2.

As shown in FIG. 3, according to Test Example 3, the concentration of the target $^{18}O$ in the final column (13th distillation column 13) was 97.1 atomic %, which was the target value.

Test Example 3

In Test Example 3, the device and the operation conditions were the same as in the Test Example 1, except that the flow rate of the gas and the liquid connecting the distillation columns was set to 3% with respect to the flow rate of the ascending gas in each column.

Figure 4:
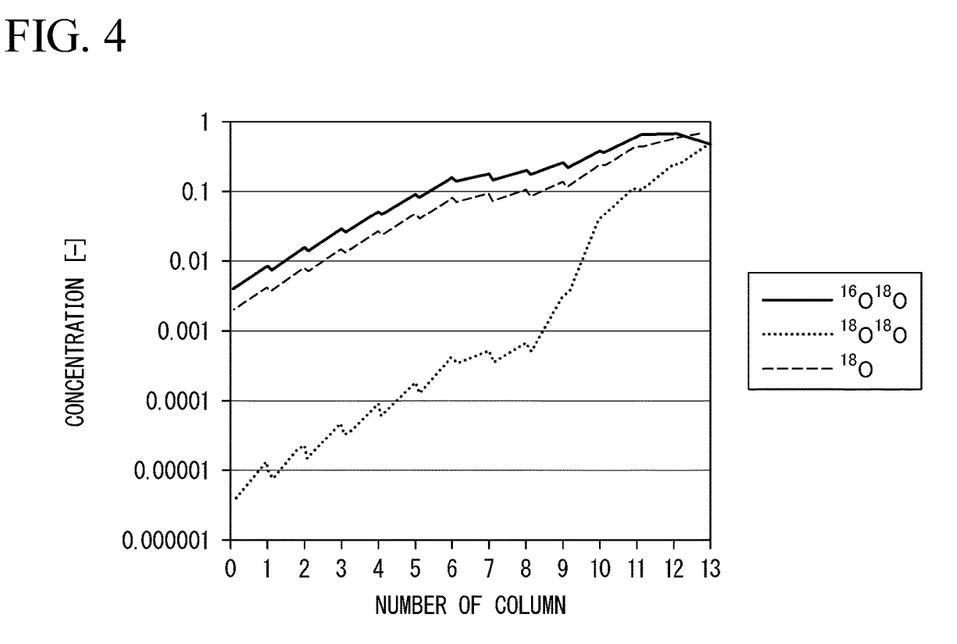
FIG. 4 is a graph for verifying the effect of the present invention.

FIG. 4 shows the concentration distribution of each distillation column in Test Example 3.

As shown in FIG. 4, according to Test Example 3, the concentration of the target $^{18}O$ in the final column (13th distillation column 13) was 96.3 atomic %, which was slightly below the set value.

In Test Examples 1 and 2, the flow rate of the gas and the liquid connecting the distillation columns was 4% or more with respect to the flow rate of the ascending gas in each column, so that the size of the equipment was appropriate and the energy consumption was optimal.

On the other hand, in Test Example 3, the flow rate of the gas and the liquid connecting the distillation columns was less than 4% with respect to the flow rate of the ascending gas in each column. Accordingly, a large difference in the concentration distribution of each column was generated, and it was impossible to collect a high-concentration product.

<Verification Test 2>

Test Example 4

$^{18}O$ was concentrated using the stable isotope concentration device 300 shown in FIG. 1. The conditions were the same as in Test Example 1 except that the target concentration of $^{18}O$ was set to 98 atomic % or more. That is, the flow rate of the gas and the liquid connecting the distillation columns was set to 5% with respect to the flow rate of the ascending gas in each column.

Figure 5:
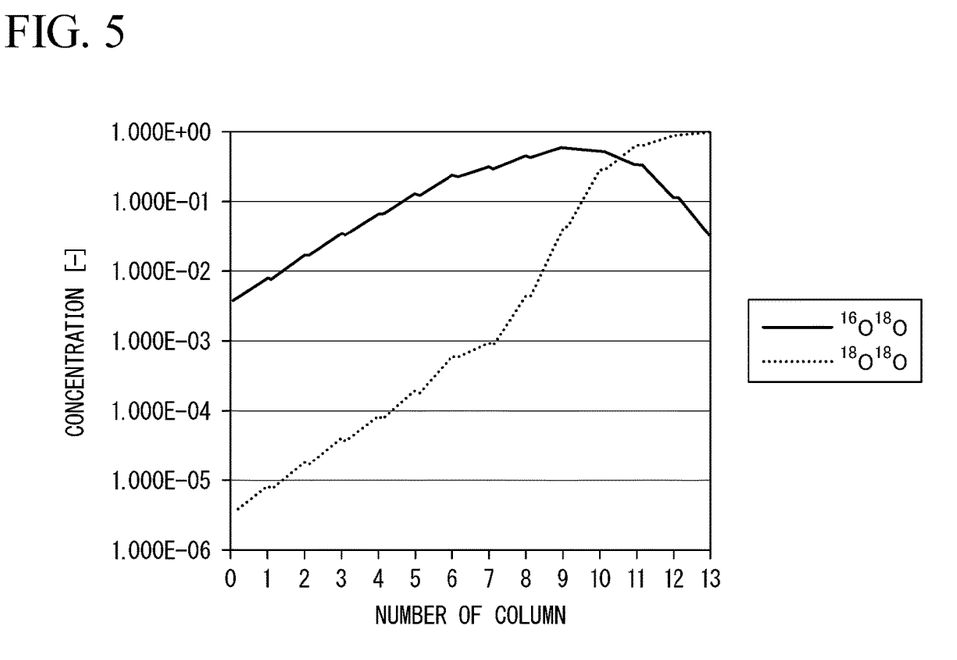
FIG. 5 is a graph for verifying the effect of the present invention.

FIG. 5 shows the concentration distribution of each distillation column in Test Example 4.

As shown in FIG. 5, according to Test Example 4, the concentration of the target $^{18}O$ in the final column (13th distillation column 13) was 98.2 atomic %.

Test Example 5

In Test Example 5, the device and the operating conditions were the same as in Test Example 4, except that the flow rate of the gas and the liquid connecting the distillation columns was set to 4% with respect to the flow rate of the ascending gas in each column.

Figure 6:
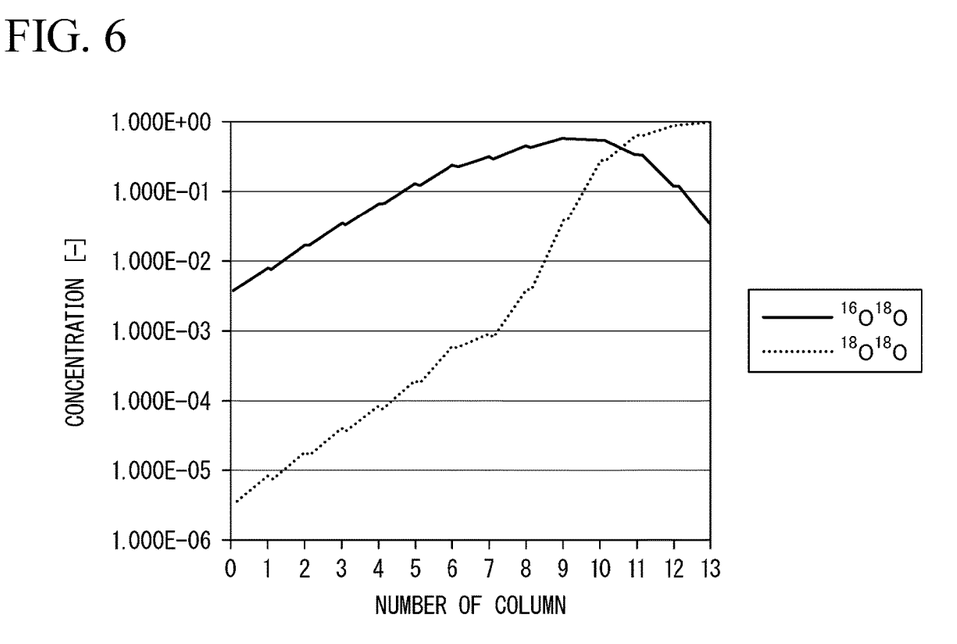
FIG. 6 is a graph for verifying the effect of the present invention.

FIG. 6 shows the concentration distribution of each distillation column in Test Example 5.

As shown in FIG. 6, according to Test Example 5, the concentration of the target $^{18}O$ in the final column (13th distillation column 13) was 98.0 atomic %.

Test Example 6

In Test Example 6, the device and the operating conditions were the same as in Test Example 4, except that the flow rate of the gas and the liquid connecting the distillation columns was set to 3% with respect to the flow rate of the ascending gas in each column.

Figure 7:
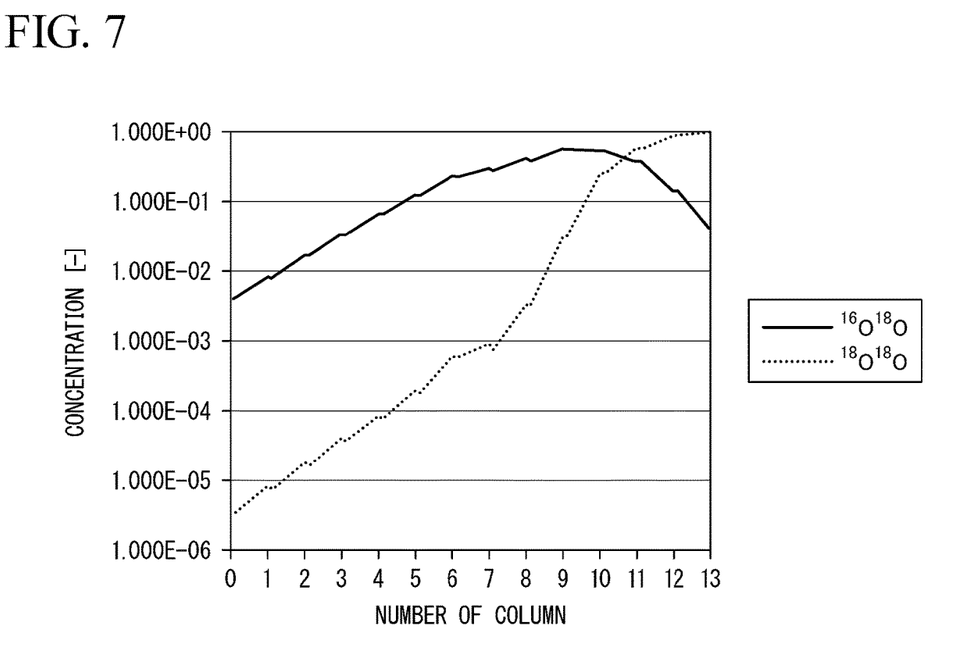
FIG. 7 is a graph for verifying the effect of the present invention.

FIG. 7 shows the concentration distribution of each distillation column in Test Example 6.

As shown in FIG. 7, according to Test Example 6, the concentration of the target $^{18}O$ in the final column (13th distillation column 13) was 97.6 atomic %, which was below the set value.

In Test Examples 4 and 5, the flow rate of the gas and the liquid connecting the distillation columns was 4% or more with respect to the flow rate of the ascending gas in each column, so that the size of the equipment was appropriate and the energy consumption was optimal.

On the other hand, in Test Example 6, the flow rate of the gas and the liquid connecting the distillation columns was less than 4% with respect to the flow rate of the ascending gas in each column. Accordingly, effective concentration increase through the distillation cascade was not achieved, and it was impossible to produce a high-concentration product.

It is clear from the results of Verification Tests 1 and 2 that even when the target concentration of $^{18}O$, which is the product, was changed (98 atomic % or more, and 97 atomic % or more), a high-concentration product could be collected by adjusting the flow rate of the gas and the liquid connecting the distillation columns with respect to the flow rate of the ascending gas to 4% or more.

INDUSTRIAL APPLICABILITY

A stable isotope concentration method for concentrating a stable isotope containing a stable isotope atom can be provided by using a distillation apparatus having a group of distillation columns in which a plurality of distillation columns are connected in series (cascaded).

EXPLANATION OF REFERENCE NUMERALS 1, 9, 10, 11, 12, 13 distillation column
21 condenser
22 reboiler
23, 24 on-off valve
25 isotope scrambler
30 raw material supply line
31 product recovery line (lead out line)
34 supply line
35 return line
300 stable isotope concentration device

The invention claimed is:

1. A stable isotope concentration method using multiple cascaded distillation columns (1st column to mth column; m is an integer of 2 or more),
   wherein the method includes a step in which one of gas and liquid is supplied from a position at the bottom of a (n−1) th column to a position at the top of an nth column (1<n=m), and when gas is supplied from the (n−1)th column to the nth column, liquid is returned, and when liquid is supplied from the (n−1)th column to the nth column, gas is returned from a position at the top of the nth column to a position at the bottom of the (n−1)th column; and
   wherein in each distillation column, when a flow rate of an ascending gas in the column is a first flow rate and a flow rate of the gas or the liquid supplied from a previous column or a next column is a second flow rate, the second flow rate is 4% by volume or more with respect to the first flow rate.

2. The stable isotope concentration method according to claim 1, wherein the stable isotope is $^{18}O$.

* * * * *